Nov. 4, 1969  E. R. VANDER WALL  3,476,083
VENTILATED CAT TOILET

Filed Nov. 24, 1967  2 Sheets-Sheet 1

INVENTOR.
EDWIN R. VANDER WALL
BY
*Hawke Knass & Gifford*
ATTORNEYS

Nov. 4, 1969   E. R. VANDER WALL   3,476,083
VENTILATED CAT TOILET

Filed Nov. 24, 1967   2 Sheets-Sheet 2

INVENTOR.
EDWIN R. VANDER WALL
BY
*Hauke Knaus & Gifford*
ATTORNEYS 3,476,083
VENTILATED CAT TOILET
Edwin Robert Vander Wall, 1235 Peninsula Court,
Traverse City, Mich. 49684
Filed Nov. 24, 1967, Ser. No. 685,459
Int. Cl. A01k 67/00
U.S. Cl. 119—1                                     10 Claims

ABSTRACT OF THE DISCLOSURE

A sanitary receptacle or cat toilet for pets having a lower pan member spaced from an upper open shell member for access for replenishing chemical deodorant material therein. The construction allows for the aeration of the chemical material while permitting the location of a horizontal litter supporting partition adjacent the base of the cat toilet to provide a substantial structure.

BACKGROUND OF THE INVENTION

Field of the invention

The present invention relates to a sanitary receptacle and more particularly to a new and improved sanitary receptacle or cat toilet for the use of pets and with particular reference to cats.

Description of the prior art

In the prior art, various methods for constructing sanitary receptacles or cat toilets have been used. One type of cat toilet provides a lower compartment in which the liquid excretia is received in a container separate from and out of contact with the sand or litter disposed in the upper compartment as disclosed in applicant's prior U.S. Patent No. 3,332,397, issued July 25, 1967, for "Odorless Cat Toilet." The disclosure of the patent is incorporated by reference herein and a reading of this patent is suggested for a more completed description of this type of receptacle. As shown in the above mentioned patent suitable litter material is disposed in an upper compartment of the receptacle and a substance having deodorizing and hydrascopic characteristics such as lime, for example, is disposed in a lower compartment. The upper compartment receives the solid and liquid excretia, retains the solids and absorbs the bulk of the liquid allowing the excess liquids to drain through to the lower compartment. It should be noted from applicant's prior patent that the receptacle disclosed therein is a one-piece member having apertures in the sides of the lower compartment to allow air to pass through, whereby the moisture is absorbed by the chemical substance.

Although applicant's patented cat toilet has been recognized as a significant advance in the art certain disadvantages have been noted. In order to replenish the supply of deodorant chemical material in the lower chamber it is necessary to remove the horizontal partition together with the litter or sand supported thereon, thereby creating an unsanitary situation as a consequence of necessary handling and possible spillage.

Further, it was found that the aeration apertures in the lower compartment were required to be located at a substantial distance above the base to prevent the apertures from being blocked or causing leakage of the chemical material. As the horizontal screen partition must be mounted above the elevated apertures an unstable or top heavy structure results. Also the height of the walls of the upper compartment were reduced which caused some scattering of litter over the walls of the receptacle by the pet when pawing the sand or litter.

As the cat toilet of the type shown in applicant's prior patent are preferably formed from resinous plastic, a relatively expensive material, it is extremely important that the finished product be constructed with the use of a minimum amount of plastic while still producing a structurally sound device. It is a well known fact within the plastics industry that the difference between the success or failure of an article formed of plastic is determined by a design employing the least amount of plastic consistent with the production of a reliable product having a reasonably long service life.

SUMMARY OF THE INVENTION

The present invention overcomes the prior art deficiencies by means of a two-part cat toilet which allows an upper shell member to be spaced from a lower pan member for aeration while providing ready access to the lower chamber in order to replenish the supply of deodorant therein. A telescopic type lap joint is employed in one embodiment consisting of a ledge portion on the lower end of the upper shell member supported on the horizontal flange portion of the lower pan member. The ledge portion of the shell member is constructed in a peripherally continuous manner so as to support both the sides and the ends of the removable grid and screen held thereon while allowing the end walls of the lower pan member to extend beyond the corresponding end walls of the shell.

Applicant's construction positions the horizontal screen partition adjacent the base of the structure while reducing the amount of material required to form the structure. The resulting improved cat toilet is thus structurally stable while providing sufficiently high side walls to prevent the scattering of litter outside the receptacle.

DESCRIPTION OF THE PREFERRED EMBODIMENTS

Figure 1:
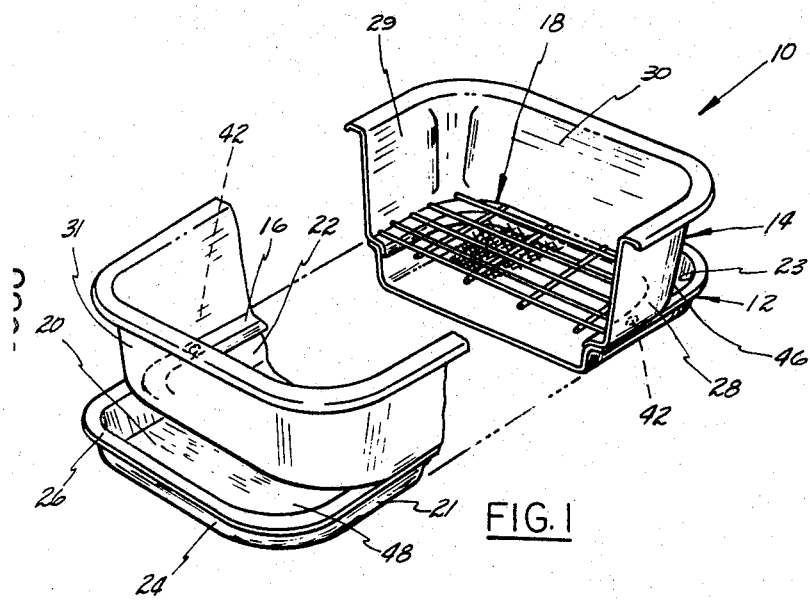
FIG. 1 is a perspective view of a cat toilet illustrating a preferred embodiment of the invention with parts cut away for the purpose of clarity.
Figures 2, 3:
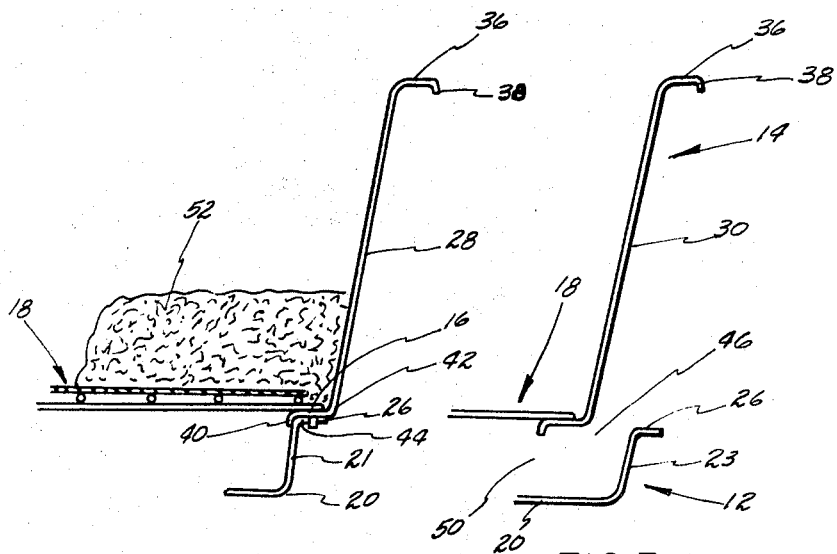
FIG. 2 is a vertical transverse section through one side of the toilet.
FIG. 3 is a vertical longitudinal section through one end of the toilet.

Referring now to the drawings, wherein the reference characters designate like or corresponding parts there is shown in FIGS. 1–3, a preferred construction of the invention. A sanitary cat toilet, generally indicated at 10, comprises a lower pan member 12 supporting an upper shell member 14 thereon. Adapted to be supported upon the ledge portion 16 of the open top shell member 14 is a horizontal perforated partition generally indicated at 18.

The pan member 12 is formed with a generally flat and rectangular bottom 20, sides 21 and 22 extending upwardly from the bottom 20, ends 23 and 24 extending upwardly from the bottom and a peripherally continuous and outwardly extending ledge 26 projecting from the sides 21 and 22 and the ends 23 and 24. The shell member 14 comprises two upwardly extending sides 28 and 29 connected integrally with the bottom, and two ends 30 and 31 connected integrally with the bottom and the two sides.

An upper peripherally continuous flange 36 extends outwardly around the opening defined by the four sides 28, 29, 30 and 31 of the shell member 14. A lip 38 extends down from the outer edge of the upper flange 36 to provide a smooth edge. The sides and ends of the lower pan member 12 together with the sides and ends of the upper shell member 14 have a slight outward inclination from the bottom 20 and the lower flange 16 respectively.

As best seen in FIG. 2, the lower peripheral ledge 16 is provided with a lip 40 which extends downwardly from the inner edge. As will be noted in FIG. 1, when the upper shell member 14 is positioned on the flange 26 of the lower pan member the two portions 16 and 26 are dimensioned so that the depending lip 40 provides a complemental telescopic engagement with the inner contour of the walls 21 and 22 of the lower pan member. In this manner a lap type joint is formed between the upper surface of the flange 26 and the under surface of ledge 16 to securely support the upper shell member in fixed relation with the lower pan 14.

While the portions 12 and 14 could be constructed of a variety of materials, the cat toilet is preferably made of a light weight plastic material molded as by thermo forming, for example, into the configuration shown in FIGS. 1-3. When constructed in this manner peg members indicated at 42 could be integrally formed on the underside of the lower ledges 16 to allow for insertions in suitably dimensioned apertures 44 provided in the flange members 26. The pegs 42 are preferably positioned on opposed side flanges of the shell member 14 in diagonally opposed relation so that the shell member 14 can be correctly aligned on the pan member 12 and provide suitable securing means between the members.

As best seen in FIG. 3 the end wall 30 of the shell member 14 is spaced inwardly from the corresponding end wall 23 of the lower pan 12 to provide a generally transverse upwardly directed opening indicated at 46. In a like manner a comparable opening 48 is formed by the extension of the end wall 24 of the lower pan beyond the end wall 31 of the shell member 14.

By means of the above described arrangement of the members the end openings 46 and 48 provide for the entrance of air into the lower pan for aeration while also allowing for the replenishment of deodorant material into the lower pan member. As disclosed in applicant's prior U.S. Patent No. 3,332,397 the fact that the chemical deodorant material, indicated at 50 in FIGS. 2 and 3, is placed in the lower pan member for the purpose of absorbing the liquid excretia passing therein renders it necessary to provide suitable aperture means above the level of the deodorant material 50.

As disclosed in my prior patent, wherein a unitary construction was employed to form the cat toilet, a plurality of openings were provided in the lower portion to allow for the introduction of air to the deodorant material. With this arrangement it was necessary to position the horizontal perforated partition approximately intermediate the overall vertical height of the receptacle in order that the apertures would be located at a height sufficiently above the level of the deodorant material to prevent clogging of the apertures or spillage of the material outwardly therethrough.

Referring again to the preferred embodiment of the instant invention shown in FIGS. 1-3, it will be noted that the joint between the upper and lower members 12 and 14 is located such that the vertical height of the side walls of the lower pan 12 is approximately one-sixth of the overall height of the assembled receptacle. It will thus be seen that by means of the lowering of the perforated screen member 18 applicant provides a more stable structure having a lower center of gravity. Also, the increased vertical height of the side walls 28–31, wherein the height of the pan is no greater than one-fourth the height of the shell member, prevents litter 56 from being scattered outside the receptacle.

The improved structure accomplishes the foregoing advantages by means of the upwardly directed openings 46 and 48 which provide a substantial area for the sufficient amount of incoming air to circulate through the lower pan while eliminating the spillage of the deodorant material 50. It will also be appreciated that the applicant's improved cat toilet also allows for ease in cleaning by virtue of the fact that the members 12 and 14 are separable.

Figure 4:
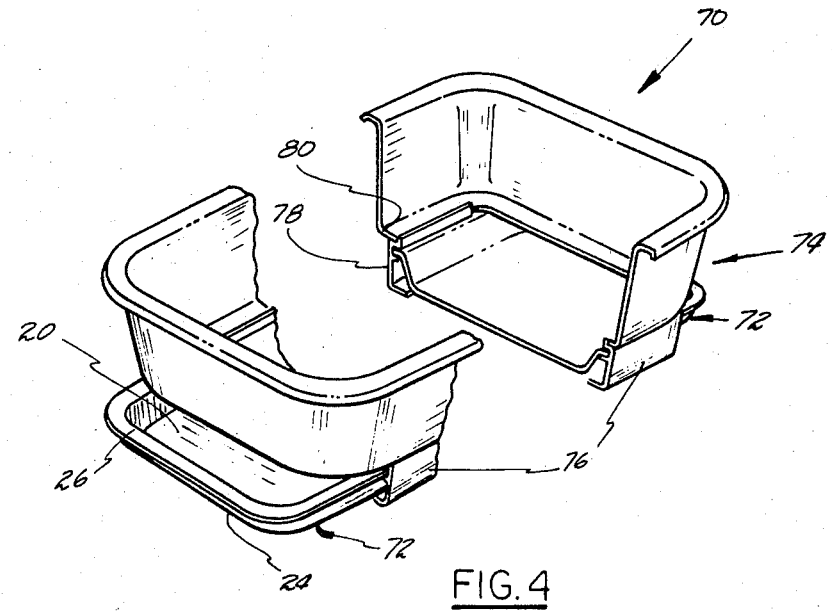
FIG. 4 is a perspective view of a cat toilet illustrating a modification of the invention with parts cut away for the purpose of clarity.
Figure 5:
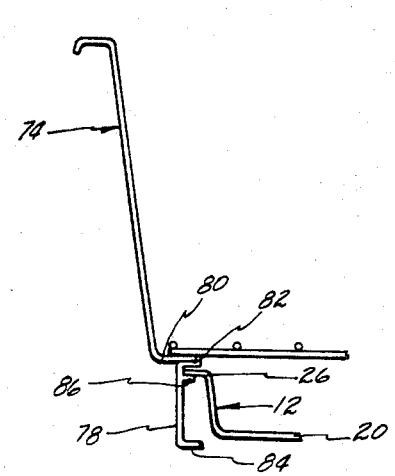
FIG. 5 is a vertical transverse section through one side of the toilet of FIG. 4.
Figure 6:
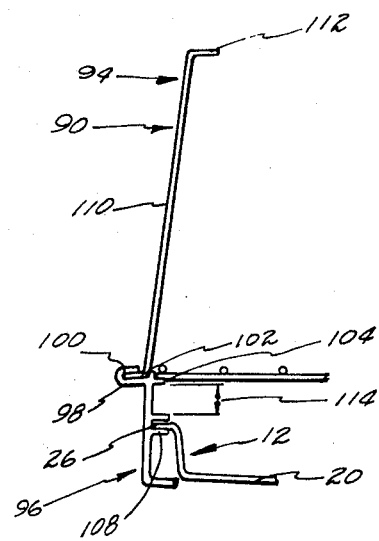
FIG. 6 is a vertical transverse section through one side of a still further modified form of the invention.

Turning now to FIGS. 4, 5 and 6 there appears an alternative construction of applicant's cat toilet employing the features of the invention. FIG. 4 shows a receptacle generally indicated by the numeral 70 and comprising a lower pan member 12 and an upper shell member 74 provided with longitudinal base members 76 and 78 for supporting the members 12 and 74. The pan portion 12 of the receptacle 70 is contemplated as being made substantially identical to the pan indicated in the embodiment of FIG. 1.

The upper shell portion 74 is constructed identically with the afore described shell member 14 with the exception that the lower continuous ledge portion 80, shown in detail in FIG. 5, is formed with a substantially horizontal edge portion. The base members 76 and 78 have an upper flange portion 82 for receiving the ledge portion 80. The portions 80 and 82 are fixably secured by a suitable means such as by adhesive cement, glue or other means. The base members are preferably formed of plastic material such as by extrusion, for example.

As seen in FIG. 5 the base member 78 has a substantially channel configuration with the lower flange portion 84 positioned below the bottom portion 20 of the pan member. The rib member 86 is formed parallel with and spaced from the upper flange member 82 to provide a suitable groove portion of rectangular cross section for receiving the flange 16 of the pan member 12. By means of this construction the pan member 12 can be slidably removed from the sanitary receptacle 70 for the purposes of cleaning and replacing the chemical deodorant material therein. In all other respects the cat toilet of FIGS. 4 and 5 is identical to the embodiment of FIGS. 1-3.

FIG. 6 shows a further modification of the form of the invention of FIGS. 4 and 5 wherein the cat toilet, indicated by numeral 90, comprises the lower pan member 12 and an upper shell member 94 provided with longitudinal base members only one of which is shown at 96.

The base member 96 is shown having an upper cross member 98 provided with a U-shaped end portion 100 forming a horizontal groove for the reception of the lower flange 102 of member 94. As in the case of the embodiment of FIGS. 4 and 5 a suitable adhesive could be employed to permanently secure the members 94 and 96. The inner portion 104 of the cross member 98 is provided as a ledge for the support of the partition 18 of FIG. 1.

In a manner similar to FIG. 5 the base 96 has parallel flanges 106 and 108 form a groove for the sliding reception of pan member 12. The side is shown having an inward inclination with the upper flange turned in to further prevent litter scattering.

It will be noted that a space indicated by the dimension line 114, is provided by the embodiment of FIG. 6. This allows for the circulation of air to the chemical material in the pan 12 without the necessity of extending the pan beyond the end walls of shell member 94 as shown in the form of the invention of both FIGS. 1 and 4.

I claim:
1. An odorless cat toilet comprising,
 (a) an open-top lower pan member having a bottom and end and side walls,
 (b) a shell member open at the bottom and top having means thereon for supporting a perforated floor partition therein,
 (c) means for supporting said shell member above said lower pan member such that the end walls of said shell member are located in spaced relation to the end walls of said pan member thereby defining a pair of through flow air passages between the shell member and the lower pan member to allow aeration of chemical deodorant litter material placed in said lower pan member.

2. The cat toilet as recited in claim 1, wherein the means for supporting said shell member above said lower pan member comprises,
   (a) said pan member being formed with a substantially horizontal outwardly directed flange around the top,
   (b) said shell member being formed with a substantially horizontal inwardly directed ledge around the bottom that matches the flange on opposed sides of said pan for supporting said shell member thereon.

3. The cat toilet as recited in claim 1, wherein said pan member end walls are positioned a defined distance outwardly from the corresponding end walls of said shell member to provide upwardly facing pasages at each end of said pan member.

4. The cat toilet as recited in claim 3, wherein the vertical height of said pan member is of the order of one-sixth the overall height of the cat toilet.

5. The cat toilet as recited in claim 2, wherein said shell ledge has a peripherally continuous depending lip dimensioned for complemental engagement with the inner contour of the side walls of said pan member.

6. The cat toilet as recited in claim 1, wherein the means for supporting said shell member above said lower pan member comprises,
   (a) longitudinal base members secured to and extending along opposed bottom edges of said shell member and each formed with an inwardly directed horizontally disposed groove therein,
   (b) said pan members being formed with a substantially horizontal outwardly directed flange around the top for reception in said grooves whereby said pan is slidably positioned within the vertical confines of said base members.

7. The cat toilet as recited in claim 6, wherein said pan member and walls are positioned a defined distance outwardly from the corresponding end walls of said shell member to provide upwardly directed passages at each end of the pan member.

8. The cat toilet as recited in claim 6, wherein said opposed base grooves are vertically spaced intermediate the vertical limits of said base members to provide an air circulation corridor between said pan member and said perforated partition.

9. The cat toilet as recited in claim 7, wherein the vertical height of said pan member is of the order of one-sixth the overall height of said cat toilet.

10. The cat toilet as recited in claim 1, wherein the vertical height of said pan member is no greater than one-fourth the vertical height of said shell member.

References Cited
UNITED STATES PATENTS

| | | | |
|---|---|---|---|
| 2,741,223 | 4/1956 | Winborn | 119—1 |
| 2,963,003 | 12/1960 | Oberg et al. | 119—1 |
| 2,971,493 | 2/1961 | Robb | 119—1 |
| 3,310,031 | 3/1967 | Lowe | 119—1 |
| 3,332,397 | 7/1967 | Vander Wall | 119—1 |

ALDRICH F. MEDBERY, Primary Examiner